United States Patent
Corleto et al.

(10) Patent No.: US 9,800,152 B2
(45) Date of Patent: Oct. 24, 2017

(54) VOLTAGE REGULATOR HAVING AUTO MODE OPTIMIZED FOR LOAD PROFILES

(71) Applicant: QUALCOMM Incorporated, San Diego, CA (US)

(72) Inventors: Hector Freires Corleto, Chandler, AZ (US); Gordon Paul Lee, Gilbert, AZ (US); Marko Harry Koski, Chandler, AZ (US); Todd Sutton, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 14/792,404

(22) Filed: Jul. 6, 2015

(65) Prior Publication Data

US 2017/0012525 A1    Jan. 12, 2017

(51) Int. Cl.
   *H02M 3/156* (2006.01)
   *H02M 3/158* (2006.01)
   *H02M 1/00* (2006.01)

(52) U.S. Cl.
   CPC ........... *H02M 3/158* (2013.01); *H02M 3/156* (2013.01); *H02M 2001/0032* (2013.01); *Y02B 70/16* (2013.01)

(58) Field of Classification Search
   CPC ...... H02M 3/156; H02M 3/157; H02M 3/158; H02M 2001/0032
   See application file for complete search history.

(56) References Cited

U.S. PATENT DOCUMENTS

| | | | | |
|---|---|---|---|---|
| 6,577,110 B2* | 6/2003 | Van Auken | ......... | H02M 3/1588 323/224 |
| 7,786,714 B2* | 8/2010 | Bacchi | .................. | H02M 3/156 323/272 |
| 2004/0070378 A1* | 4/2004 | Baldwin | ............... | H02M 3/156 323/282 |
| 2006/0056210 A1 | 3/2006 | Yamada et al. | | |
| 2013/0342181 A1 | 12/2013 | Suppanz et al. | | |
| 2014/0266117 A1 | 9/2014 | Goncalves et al. | | |

(Continued)

FOREIGN PATENT DOCUMENTS

JP    2002058239 A    2/2002

OTHER PUBLICATIONS

International Search Report—PCT/US2016/039390—ISA/EPO—Oct. 27, 2016.
Written Opinion—PCT/US2016/039390—ISA/EPO—Oct. 27, 2016.

*Primary Examiner* — Gary L Laxton
(74) *Attorney, Agent, or Firm* — Haynes and Boone, LLP

(57) ABSTRACT

Disclosed is a voltage regulator circuit configured to selectively operate the voltage regulator circuit in a first mode of operation and a second mode of operation. The voltage regulator can change operation of the voltage regulator circuit between the first mode of operation to the second mode of operation in response to a change in a sensed load condition of the voltage regulator circuit. The voltage regulator can change operation from the second mode of operation to the first mode of operation in response to the sensed load condition changing from the second load condition to the first load condition, but only when the sensed load condition has not changed in a given direction between the first load condition and the second load condition for at least a predetermined period of time T.

23 Claims, 5 Drawing Sheets

(56) References Cited

U.S. PATENT DOCUMENTS

| | | |
|---|---|---|
| 2014/0292292 A1 | 10/2014 | Koski |
| 2014/0312858 A1 | 10/2014 | Sreenivas et al. |
| 2014/0347003 A1 | 11/2014 | Sporck et al. |
| 2015/0091544 A1* | 4/2015 | Jayaraj ............... H02M 3/156 323/284 |

* cited by examiner

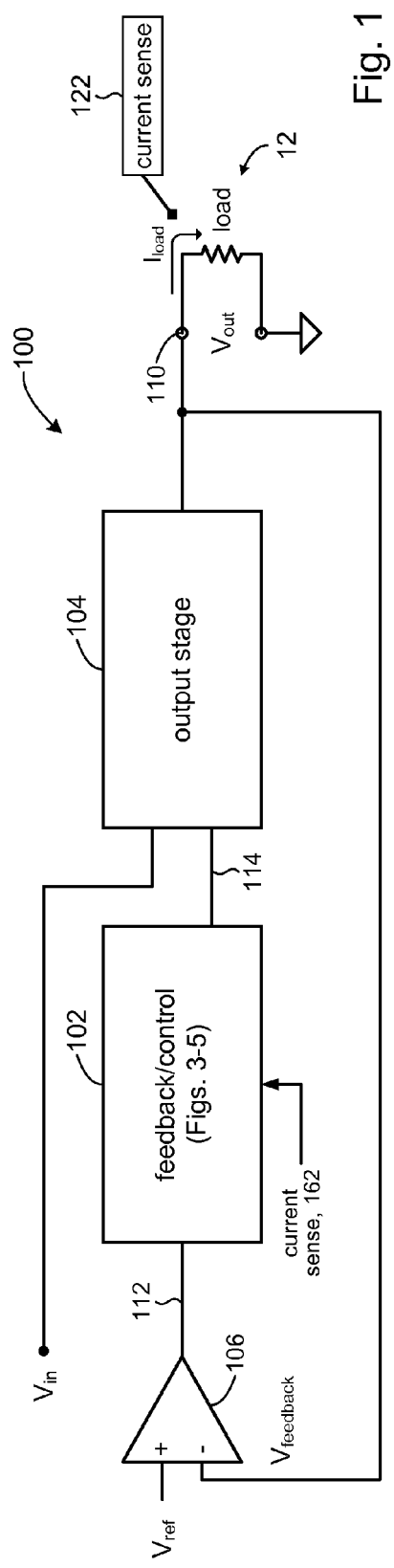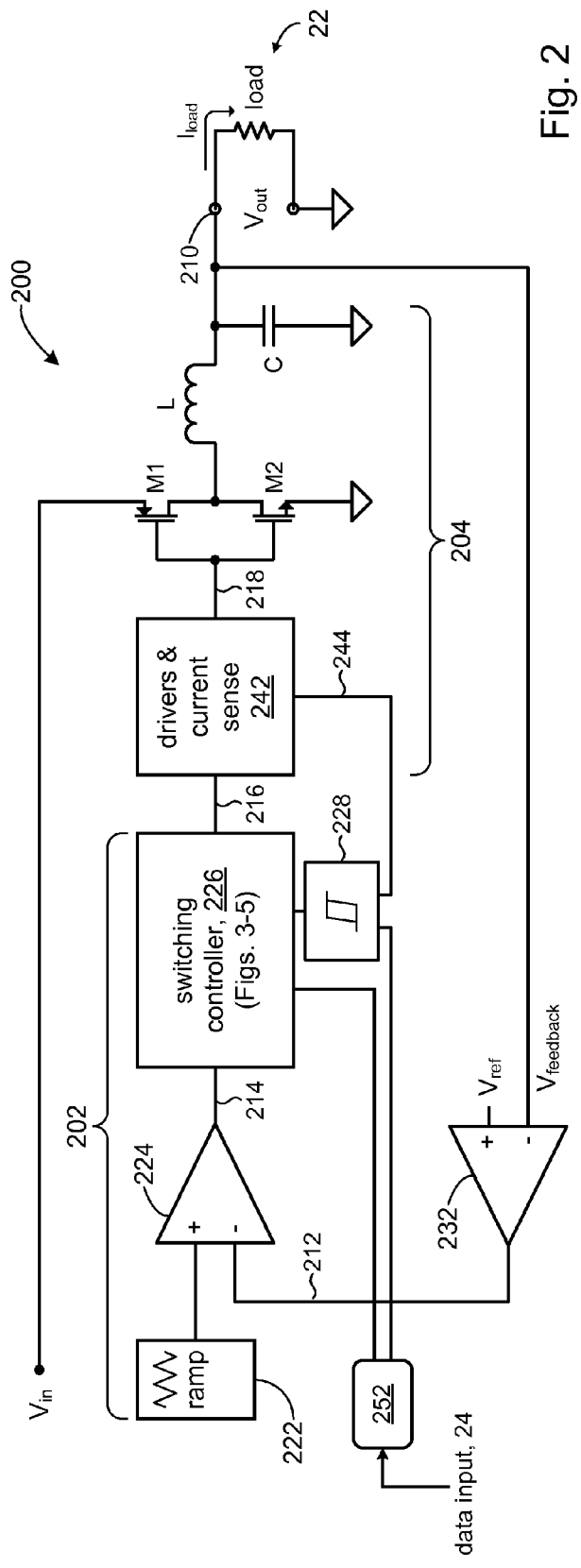

VOLTAGE REGULATOR HAVING AUTO MODE OPTIMIZED FOR LOAD PROFILES

BACKGROUND

Unless otherwise indicated, the foregoing is not admitted to be prior art to the claims recited herein and should not be construed as such.

A voltage regulator provides a relatively constant DC output voltage, using circuitry to continuously hold the output voltage at a given value regardless of changes in load current or input voltage. A linear voltage regulator operates by using a voltage-controlled current source to force a fixed voltage to appear at the output terminal of the linear regulator. A switching voltage regulator uses two power switches to transfer energy from input to output via an inductor and a bulk capacitor.

Switching voltage regulators are generally more efficient than linear voltage regulators over a wide range of voltage inputs and output current conditions. However, at lower loads, the efficiency of switching voltage regulators can tail off as the quiescent current of the circuits comprising the switching voltage regulator itself becomes a significant contributor to system losses.

SUMMARY

In some aspects of the present disclosure, a method in a voltage regulator circuit may include selectively operating the voltage regulator circuit in either a first mode of operation or a second mode of operation. The voltage regulator may change operation of the voltage regulator circuit from the first mode of operation to the second mode of operation in response to a change in a sensed load condition of the voltage regulator circuit from a first load condition to a second load condition. The voltage regulator may further change operation from the second mode of operation to the first mode of operation in response to the sensed load condition changing from the second load condition to the first load condition, but only when the sensed load condition has not changed in a given direction between the first load condition and the second load condition for at least a predetermined period of time T. In some aspects, the direction of change is from the first load condition to the second load condition. In some aspects, the direction of change is from the second load condition to the first load condition.

In some aspects, the voltage regulator may access a programmable data storage configured to store a value representative of the predetermined period of time T.

In some aspects, changing operation of the voltage regulator circuit from the first mode of operation to the second mode of operation may include starting a timer to run for the predetermined period of time T. The timer may be restarted in response to a change in the sensed load condition in the given direction before expiration of the timer. The voltage regulator may change operation from the second mode of operation to the first mode of operation only at a time subsequent to expiration of the timer. In some aspects, the timer is restarted in response to detecting a change in the sensed load condition from the first load condition to the second load condition prior to expiration of the timer. In some aspects, the timer is restarted in response to detecting a change in the sensed load condition from the second load condition to the first load condition prior to expiration of the timer. In some aspects, the timer is restarted at expiration of the timer in response to detecting a change in the sensed load condition from the second load condition to the first load condition prior to expiration of the timer.

In some aspects, the first load condition is indicated in response to a sensed output current at the output of the voltage regulator circuit being less than a first threshold value. In some aspects, the second load condition is indicated in response to the sensed output current being greater than a second threshold value. In some aspects, the first threshold value is less than the second threshold value.

In some aspects, the voltage regulator circuit is operated as a buck regulator. In some aspects, the first mode of operation is a pulse-skipping mode.

In some aspects according to the present disclosure, a voltage regulator may include first means for selectively operating the voltage regulator circuit in a first mode of operation and a second mode of operation and second means for changing operation of the voltage regulator circuit from the first mode of operation to the second mode of operation in response to a change in a sensed load condition at an output of the voltage regulator circuit from a first load condition to a second load condition. The second means may change operation of the voltage regulator circuit from the second mode of operation to the first mode of operation in response to the sensed load condition changing from the second load condition to the first load condition, but only when the sensed load condition has not changed in a given direction between the first load condition and the second load condition for at least a predetermined period of time T.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIG. 1 depicts a high level block diagram of a voltage regulator in accordance with the present disclosure.

FIG. 2 depicts a high level block diagram of a buck regulator in accordance with the present disclosure.

DETAILED DESCRIPTION

Figure 3:
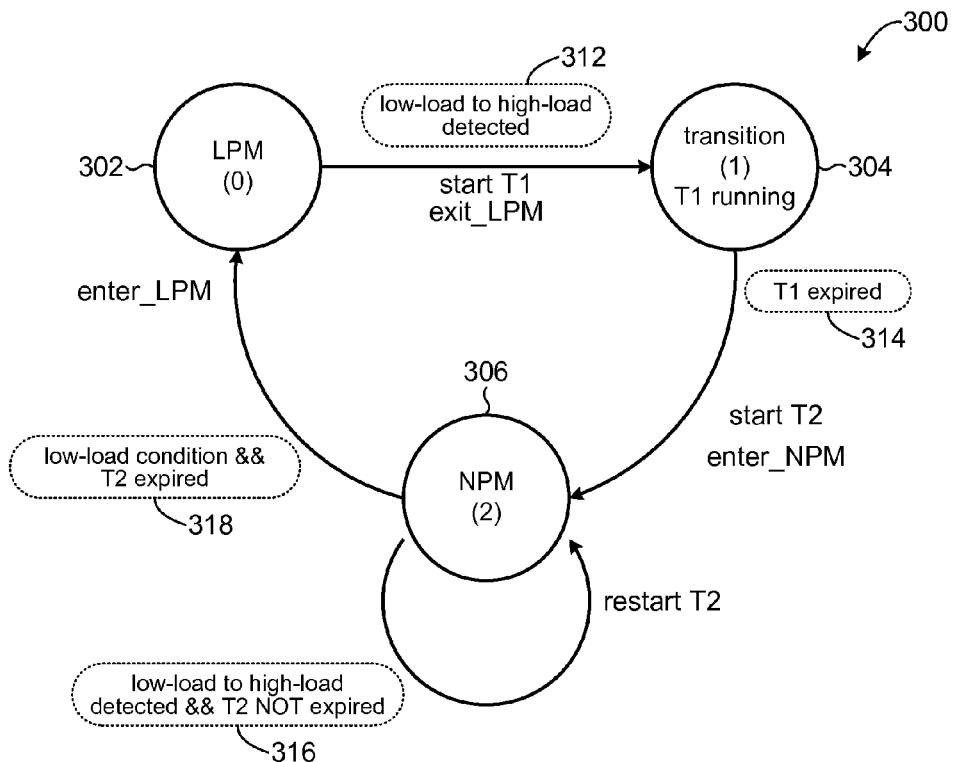
FIGS. 3, 4, and 5 show embodiments of state transition diagrams in accordance with the present disclosure.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

FIG. 1 shows a high level block diagram of a voltage regulator 100 configured to produce a regulated output voltage $V_{out}$ at an output 110 in accordance with the present disclosure to drive a load 12. The voltage regulator 100 may include a feedback/control stage 102 and an output stage 104. A feedback signal $V_{feedback}$ may be provided from the output 110 and compared to a reference voltage $V_{ref}$ by error amplifier 106 to produce an error signal 112. The feedback/control stage 102 may be configured to receive the error signal 112 to produce a control signal 114. The output stage 104 may be configured to receive the control signal 114 and generate output voltage $V_{out}$ based on the control signal 114, thus regulating the output 110 according to the reference voltage $V_{ref}$.

In accordance with the present disclosure, the voltage regulator 100 may further include a current sense circuit 122 configured to generate a current sense signal 162 that is indicative of the load current $I_{load}$ flowing into load 12 during operation. The current sense signal 162 may be provided to the feedback/control stage 102. As will be discussed in more detail below in various embodiments according to the present disclosure, the load current $I_{load}$ may be indicative of the load condition (e.g., low load, high load) at the output 110. The feedback/control stage 102 may control the output stage 104 according to the load condition at the output 110 in accordance with the state transition diagrams shown in FIGS. 3-5.

The discussion will turn to a particular example of voltage regulator 100 to explain further details of the present disclosure. FIG. 2 shows a voltage regulator known as a switching voltage regulator, and in particular a buck regulator 200. Although the buck regulator 200 will be used as the example, it will be understood by those of ordinary skill that the present disclosure can be adapted to other types of voltage regulators. FIG. 2 depicts a high level representation of the buck regulator 200 and omits details of an actual implementation to simplify the discussion.

The buck regulator 200 may produce a regulated voltage $V_{out}$ at output 210 to drive a load 22. In some embodiments, the buck regulator 200 may include a feedback/control stage 202 and an output stage 204. A feedback signal $V_{feedback}$ may be provided from the output 210 and compared to a reference voltage $V_{ref}$ by error amplifier 232 to produce an error signal 212. In some embodiments, the output 210 may be divided down to produce $V_{feedback}$; e.g., using a resistor divider (not shown).

The feedback/control stage 202 may include a ramp generator 222 configured to produce a ramp signal. A comparator 224 may compare the ramp signal with the error signal 212 to generate a control signal 214. The feedback/control stage 202 may include a switching controller 226 configured to receive the control signal 214 from comparator 224 to produce a switching signal 216. In accordance with some embodiments of the present disclosure, the feedback/control state 202 may include a hysteresis comparator 228 with hysteresis. This aspect of the present disclosure will be discussed in more detail below.

The output stage 204 may include circuitry 242, power switches M1, M2, an inductor L, and an output capacitor C. The circuitry 242 may include a driver circuit configured to receive the switching signal 216 to generate gate drive signals 218 that can drive power switches M1, M2.

In accordance with the present disclosure, the circuitry 242 may further include current sense circuitry configured to produce a current sense signal 244 that is indicative of a load current $I_{load}$ at the output 210 provided to load 22. In some embodiments, the current sense signal 244 may be a digital signal that represents $I_{load}$. In other embodiments, the current sense signal 244 may be an analog signal represents $I_{load}$. The load current $I_{load}$ can be indicative of the load condition (e.g., low load, high load) at the output 210. The feedback/control stage 202 may control the output stage 204 according to the load condition at the output 210 in accordance with the state transition diagrams shown in FIGS. 3-5.

The buck regulator 200 may receive data from a memory 252. A user may provide data 24 to be stored in the memory 252. The memory 252 may be any suitable non-volatile data storage device such as flash memory and the like. Data stored in memory 252 may be used in the switching controller 226 and the hysteresis comparator 228. This aspect of the present disclosure will be discussed below.

Switching voltage regulators such as buck regulator 200 may operate in different modes depending on the load condition sensed at the output 210. In some embodiments, for example, the load condition may be determined based on the load current $I_{load}$ flowing into load 22 during operation of the buck regulator 200. The buck regulator 200 may include a first mode of operation referred to as low power mode (LPM mode). The buck regulator 200 may operate in LPM mode when a first load condition is sensed at the output 210. In some embodiments, for example, the buck regulator 200 may operate in LPM mode during a low-load condition, which may be indicated when the load current $I_{load}$ is less than a first threshold value $Th_{low}$ (e.g., less than several 100 mA). The particular value of $Th_{low}$ can vary depending on circuit design, performance ratings of the components that comprise the buck regulator 200, and other considerations that are not relevant to the present disclosure.

The buck regulator 200 may include a second mode of operation referred to as normal power mode (NPM mode). The buck regulator 200 may operate in NPM mode when a second load condition is sensed at the output 210. In some embodiments, for example, the buck regulator 200 may operate in NPM mode during a high-load condition, which may be indicated when the load current $I_{load}$ is higher than a second threshold value $Th_{high}$ (e.g., greater than several 100 mA). The particular value of $Th_{high}$ can vary depending on circuit design, performance ratings of the components that comprise the buck regulator 200, and other considerations that are not relevant to the present disclosure.

During NPM mode, the power switches M1, M2 are always being switched to maintain a current flow across the inductor L in order to maintain the voltage at the output 210 above the reference voltage. NPM mode is sometimes referred to a continuous current mode.

However, under sufficiently low-load conditions, the output capacitor C can maintain the output voltage for some period of time between switching pulses. Accordingly, the output voltage at the output 210 may be allowed to drop below the reference voltage while still being able to power the load 22. Thus, under low-load conditions the buck regulator 200 may operate in LPM mode where switching of M1, M2 can skip one or more clock cycles, allowing the inductor current to fall to zero. LPM mode is sometimes referred to as power saving mode, pulse-skipping mode, and so on.

Changing operation of the buck regulator 200 between LPM mode and NPM mode can occur automatically as the load condition changes between low-load conditions and high-load conditions. However, if the load conditions change too fast, a situation can occur where the buck regulator 200 is constantly changing between LPM and NPM modes in a cycling fashion. The buck regulator 200 can therefore spend most of its time in a mode transition state, rather than a static mode. In accordance with the present disclosure, the buck regulator 200 can be kept in NPM mode during a dynamic load burst 'envelope' during which the load conditions are changing faster than a programmable period of time. The discussion will now turn to this aspect of the present disclosure.

FIG. 3 shows a state transition diagram 300 in accordance with the present disclosure. The state transition diagram 300 represents an operation in the switching controller 226 for switching operation of the buck regulator 200 between a first mode of operation (e.g., LPM mode) and a second mode of operation (e.g., NPM mode). The description of the state transition diagram 300 can start with the switching controller 226 in state 302 (LPM mode) without loss of generality. The switching controller 226 may switch operation of the buck regulator 200 from LPM mode to NPM mode in response to the occurrence of a low-load to high-load event 312. In some embodiments, for example, a low-load to high-load event 312 may be signaled when the sensed load current $I_{load}$ at the output 210 changes from being less than a low-current threshold level (e.g., $Th_{low}$) to being greater than a high-current threshold level (e.g., $Th_{high}$).

The switching controller 226 may transition from state 302 to a transitional state 304. The transition may include the switching controller 226 asserting an exit_LPM signal to set operation of the buck regulator 200 in NPM mode. The switching controller 226 may start or otherwise initiate a timer T1. The transitional state 304 may be included in some embodiments to provide a settling period to allow the circuits that comprise the buck regulator 200 to settle as the circuits change from operating in LPM mode to operating in NPM mode. In other embodiments, the transitional state 304 may be omitted. The switching controller 226 can transition from the transitional state 304 to state 306 (NPM mode) in response to the timer T1 expiring (event 314) or otherwise completing, thus completing the transition from operating the buck regulator 200 in LPM mode to operating in NPM mode.

Operation of the buck regulator 200 may remain in NPM mode until a high-load to low-load event occurs. However, as explained above, in accordance with the present disclosure if the load conditions are too dynamic, the buck regulator 200 can remain in NPM mode until the load conditions become less dynamic.

Continuing with FIG. 3, the state transition diagram 300 provides an example of handling load conditions that are too dynamic in accordance with some embodiments of the present disclosure. When the buck regulator 200 transitions from state 304 to state 306, the transition may include starting a timer T2. The switching controller 226 may remain in NPM mode (state 306) so long as the timer T2 is running, despite any changes in the load conditions.

In accordance with some embodiments, if a low-load to high-load transition is sensed while the timer T2 is still running (event 316), the timer T2 may be restarted to maintain the switching controller 226 in NPM mode (state 306) for another cycle of the timer T2. Since the timer T2 is reset each time event 316 occurs, the transition from NPM mode (state 306) to LPM mode (state 302) is made only when changes in the load condition in the direction from the low-load condition to the high-load condition do not occur for at least the period of time determined by timer T2.

Concluding the description of FIG. 3, if the low-load condition exists or occurs after the timer T2 has expired (event 318), then the switching controller 226 may transition from state 306 to state 302 (LPM mode). The transition may include asserting a signal enter_LPM to set operation of the buck regulator 200 to LPM mode.

Figure 4:
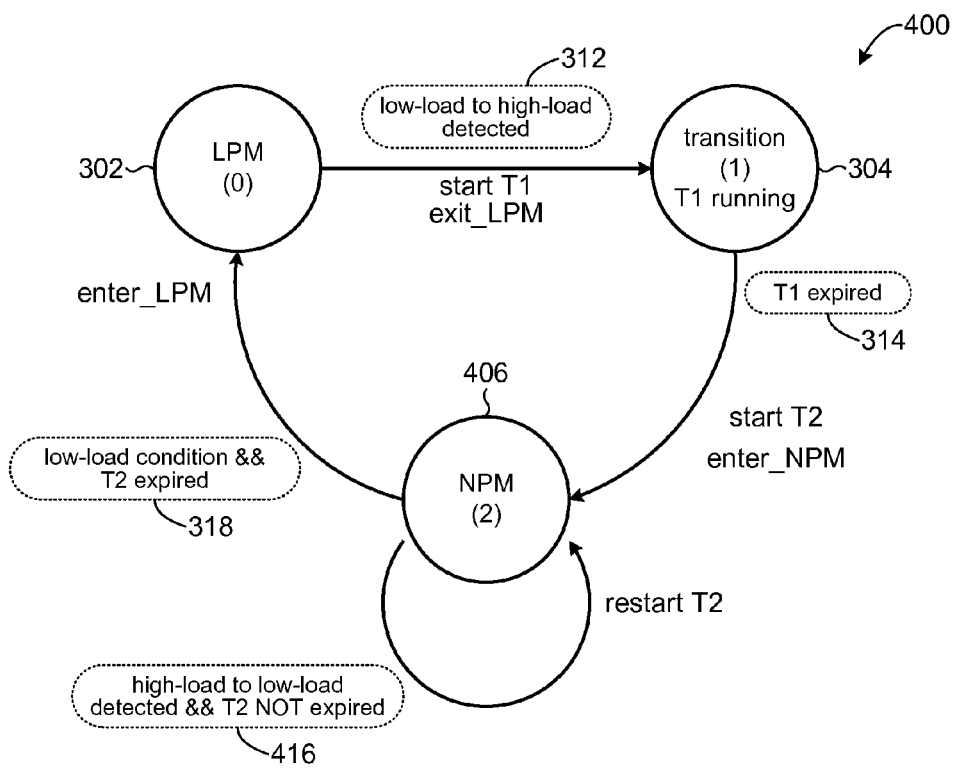

FIG. 4 shows a state transition diagram 400 similar to that shown in FIG. 3 for the transitions from state 302 to state 304 and from state 304 to state 406. The state transition diagram 400 provides another example of handling load conditions that are too dynamic in accordance with some embodiments of the present disclosure. When the buck regulator 200 transitions from state 304 to state 406, the transition may include starting a timer T2. The switching controller 226 may remain in NPM mode (state 406) so long as the timer T2 is running, despite any changes in the load conditions.

In accordance with some embodiments, if a high-load to low-load transition is sensed while the timer T2 is still running (event 416), the timer T2 may be restarted to maintain the switching controller 226 in NPM mode (state 406) for another cycle of the timer T2. Since the timer T2 is reset each time event 416 occurs, the state transition diagram 400 allows transitions from NPM mode (state 406) to LPM mode (state 302) only when there are no changes in the load condition in the direction from high-load to low-load for at least the period of time determined by timer T2.

Concluding the description of FIG. 4, if the low-load condition exists or occurs after the timer T2 has expired (event 318), then the switching controller 226 may transition from state 406 to state 302 (LPM mode). The transition may include asserting a signal enter_LPM to set operation of the buck regulator 200 to LPM mode.

Figure 5:
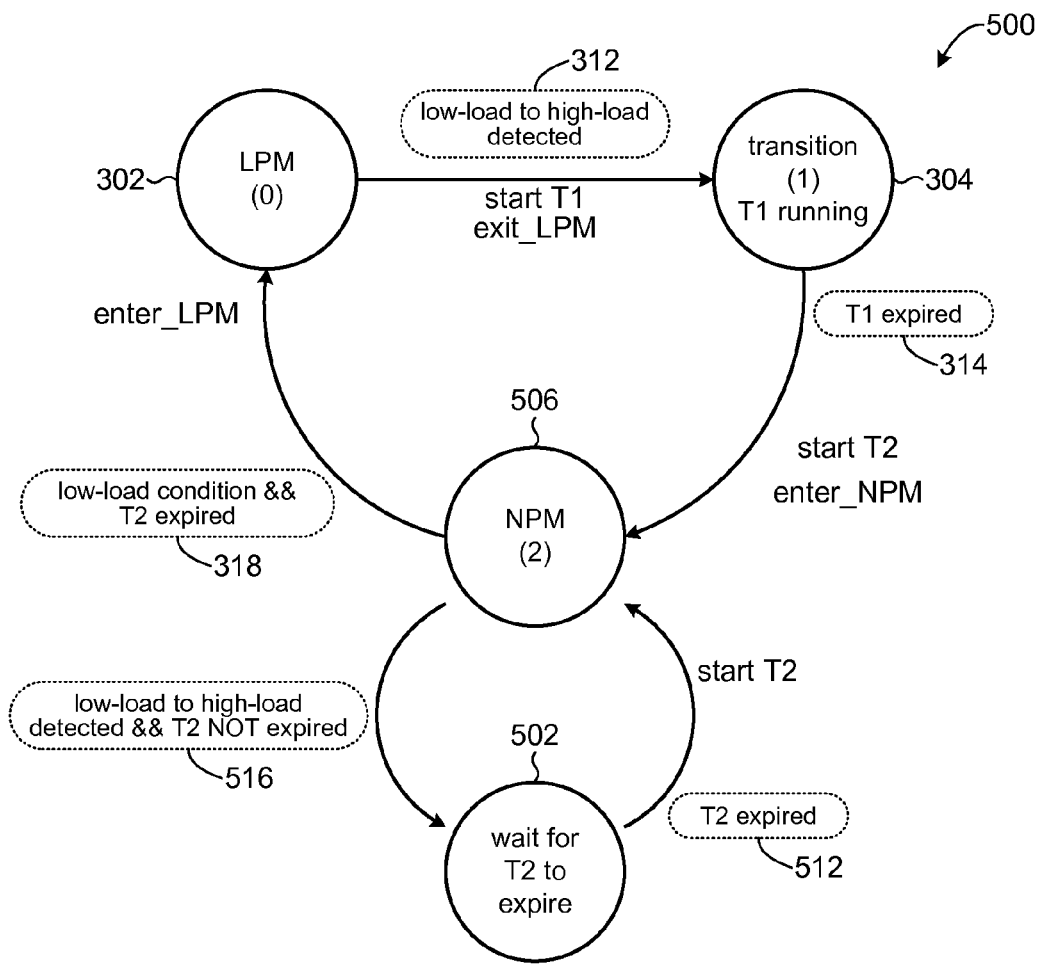

FIG. 5 shows a state transition diagram 500 similar to that shown in FIG. 3 for the transitions from state 302 to state 304 and from state 304 to state 506. The state transition diagram 500 provides another example of handling load conditions that are too dynamic in accordance with some embodiments of the present disclosure. When the buck regulator 200 transitions from state 304 to state 506, the transition may include starting a timer T2. The switching controller 226 may remain in NPM mode (state 306).

However, if a low-load to high-load transition is sensed while the timer T2 is still running (event 516), the switching controller 226 may transition from state 506 to state 502, which is a wait state for the timer T2 to expire (event 512). When the timer T2 expires in state 502, the switching controller 226 may transition back to state 506 and restart the timer T2.

Concluding the description of FIG. 5, if the low-load condition exists or occurs after the timer T2 has expired (event 318) in state 506, then the switching controller 226 may transition to state 302 (LPM mode). The transition may include asserting a signal enter_LPM to set operation of the buck regulator 200 to LPM mode.

Figure 6:
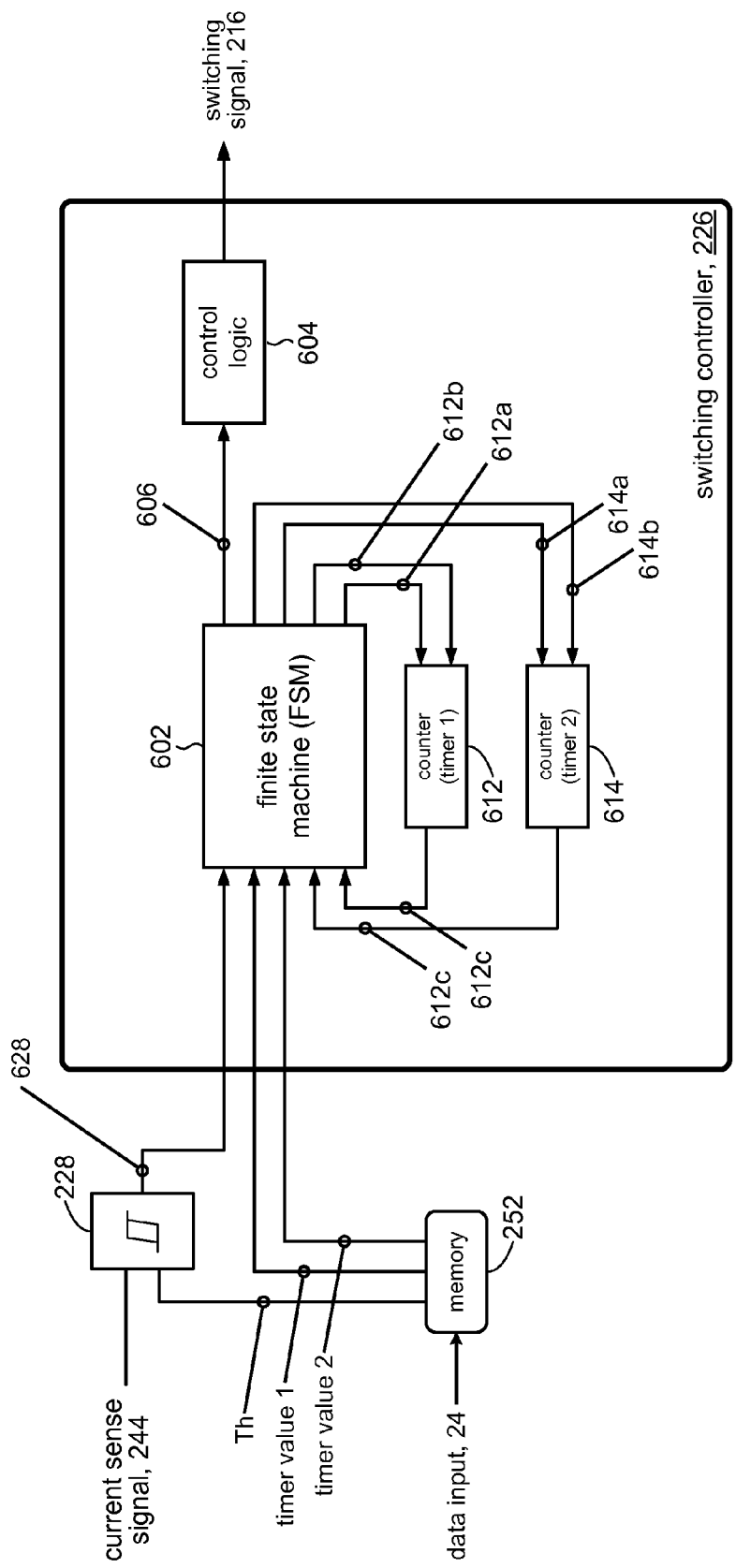
FIG. 6 illustrates a high level block diagram of the switching controller shown in FIG. 2 in accordance with some embodiments of the present disclosure.

FIG. 6 shows an illustrative embodiment of the switching controller 226 in accordance with some embodiments. The switching controller 226 may include a finite state machine ("state machine") 602 and control logic 604. The state machine 602 may use timers 612, 614. In various embodiments, the state machine 602 can implement the state transition diagrams shown in FIGS. 3-5. The state machine 602 may output mode signal 606 to indicate NPM mode or LPM mode. The state machine 602 represents an example of a means for changing operation of the buck regulator between NPM mode and LPM mode. The mode signal 606 represents the exit_LPM and enter_LPM signals shown in the state transition diagrams in FIGS. 3-5.

The control logic 604 may generate the switching signal 216 to control operation of the power switches M1, M2. The control logic 604 represents an example of a means for operating the buck regulator 200 in NPM mode or LPM mode, depending on the mode signal 606. For example, the control logic 604 may include logic configured to perform pulse skipping to provide operation in LPM mode. The logic may be enabled (LPM mode) or disabled (NPM mode) depending on the mode signal 606.

Referring to the discussion of the state transition diagrams in FIGS. 3-5, the load condition at the output 210 of the buck regulator 200 (FIG. 2), in some embodiments, may be determined based on the load current $I_{load}$. For example, a low-load condition may be indicated if the load current $I_{load}$ is less than a threshold value $Th_{low}$, and a high-load condition may be indicated if the load current $I_{load}$ is greater than a threshold value $Th_{high}$. In some embodiments, there may be a gap between $Th_{high}$ and $Th_{low}$; e.g., $Th_{high} = Th_{low} + \Delta_{hysteresis}$. The gap $\Delta_{hysteresis}$ between $Th_{high}$ and $Th_{low}$ can avoid false determinations of high- and a low-load conditions that may result due to spurious artifacts in the load current $I_{load}$.

In some embodiments, the state machine 602 may use the current sense signal 244 to determine changes in the load condition at the output 210 (e.g., FIG. 2) between a low-load condition and a high-load condition. As explained above, the current sense signal 244 may represent the load current $I_{load}$ into load 22. The hysteresis comparator 228 may compare the current sense signal 244 with a threshold value Th (e.g., stored in memory 252) to assert or de-assert a load signal 628 that indicates, respectively, a low-load to high-load transition has occurred or a high-load to low-load transition has occurred.

In some embodiments, for example, the threshold value Th may represent the low-load threshold value $Th_{low}$. Accordingly, the hysteresis comparator 628 may be configured to de-assert load signal 628 (low-load condition) when the current sense signal 244, falls below the threshold value Th. Conversely, the hysteresis comparator 628 may be configured to assert the load signal 628 (high-load condition) when the current sense signal 244 rises above a value $(Th + \Delta_{hysteresis} = Th_{high})$, where $\Delta_{hysteresis}$ is the hysteresis of the hysteresis comparator 228.

In other embodiments, the threshold value Th may represent the high-load threshold value $Th_{high}$. Accordingly, the hysteresis comparator 228 may be configured to assert the load signal 628 (high-load condition) when the current sense signal 244 rises above the threshold value Th. Conversely, the hysteresis comparator 228 may be configured to de-assert the load signal 628 (low-load condition) when the load current $I_{load}$ falls below a value $(Th - \Delta_{hysteresis} = Th_{low})$, where $\Delta_{hysteresis}$ is the hysteresis of the hysteresis comparator 228.

The state machine 602 may use timers 612, 614 as respective timers T1, T2 shown in the state transition diagrams in FIGS. 3-5. In some embodiments, the timers 612, 614 may be counters or other suitable clock based logic. In other embodiments, the timers 612, 614 may be timer based logic. The timer values for timers 612, 614 may be programmable. For example, the timer values may be stored in memory 252 and read in by the state machine 602. The state machine 602 may produce enable signals 612a, 614a to start respective timers 612, 614, including supplying the timers 612, 614 with their respective timer values. The state machine 602 may produce clear signals 612b, 614b to stop the timers 612, 614, for example, to restart the timers 612, 614 pursuant to the state transition diagrams in FIGS. 3 and 4. The timers 612, 614 may be configured to assert respective timer complete signals 612c, 614c upon expiration of completion of the timers.

Figure 7:
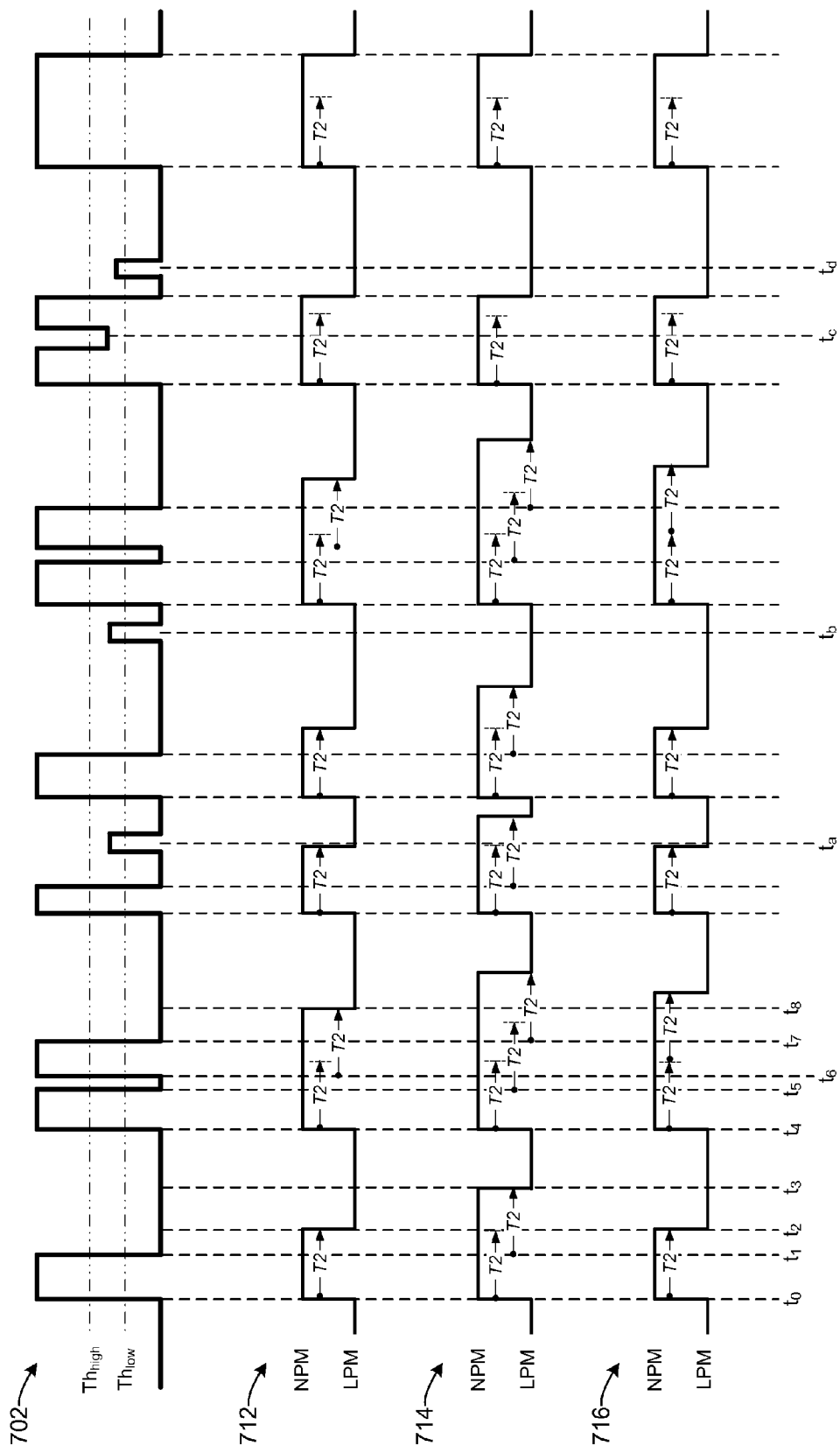
FIG. 7 shows examples of timing diagrams to illustrate handling of load conditions in accordance with the present disclosure.

FIG. 7 shows timing diagrams to illustrate handling of different examples of load conditions according to the state transition diagrams in FIGS. 3-5. The top trace a load profile 702 represents an example of load current $I_{load}$ at the output 210 (FIG. 2) of buck regulator 200 over a period of time. The load profile 702 includes the high-load threshold value $Th_{high}$ and the low-load threshold value $Th_{low}$, which represent respectively a high-load condition and a low-load condition. A low-load to high-load (low-to-high) transition is triggered or otherwise indicated at times such as $t_0$, $t_4$, and $t_6$ when the load current changes from less than $Th_{low}$ to greater than $Th_{high}$; e.g., load signal 628 (FIG. 6) may be asserted. Likewise, a high-load to low-load (high-to-low) transition is triggered or otherwise indicated at times such as $t_1$, $t_5$, and $t_7$, when the load current changes from greater than $Th_{high}$ to less than $Th_{low}$; e.g., load signal 628 may be de-asserted.

In some embodiments, the threshold values $Th_{high}$, $Th_{low}$ may include hysteresis. With reference to the load profile 702 in FIG. 7, for example, the load current transitions in the pulses that occur at times $t_a$, $t_b$, $t_c$, and $t_d$ would not trigger an indication of a transition in the load condition. For example, the load current transitions in the pulses that occur at times $t_a$, $t_b$, and $t_d$ would not trigger a low-to high transition because the pulses do not cross from less than $Th_{low}$ to greater than $Th_{high}$; accordingly, the load signal 628 remains de-asserted. Likewise, the load current transitions in the pulse at time $t_c$ would not trigger a high-to-low transition because the pulse does not cross from greater than $Th_{high}$ to less than $Th_{low}$; the load signal 628, accordingly, remains asserted.

The traces 712, 714, 716 represent examples of the mode signal 606 (FIG. 6) of state machine 602 in accordance with respective state transition diagrams 300 (FIG. 3), 400 (FIG. 4), 500 (FIG. 5). For example, the LPM mode of operation may be indicated by de-asserting the mode signal 606, and the NPM mode of operation may be indicated by asserting the mode signal 606. To keep the timing diagrams simple, the traces 712, 714, and 716 omit the intermediate transitional state 304 shown in the state transition diagrams 300, 400, 500.

The trace 712 represents operation of the state machine 602 in accordance with the state transition diagram 300 shown in FIG. 3. For example, the load profile 702 shows a low-to-high transition at time t0. Accordingly, the trace 712 shows that the mode signal 606 is asserted (NPM mode) and timer T2 is initiated at time t0. In accordance with the state transition diagram 300, the state machine 602 does not respond to high-to-low transitions while timer T2 is running, allowing, for example, the timer T2 to expire at time $t_2$. Also, the mode signal 606 is de-asserted in response to the low-load condition at time $t_2$; the load profile 702 shows the load is less than $Th_{low}$.

By comparison, at time $t_6$, the load profile 702 shows a low-to-high transition. The trace 712 shows that the state machine 606, operating in accordance with state transition diagram 300, restarts the timer T2 at time $t_6$, in response to the low-to-high transition occurring while timer T2 is running. The timer T2 expires at time $t_8$, and since the load profile 702 shows a low-load condition at time $t_8$, the mode signal 606 is de-asserted (LPM mode).

Noteworthy is the low-to-high transition that occurs with the pulse at time $t_a$ and $t_b$. This low-to-high transition does not trigger a restart of timer T2 because the transition does not become greater than the high-load threshold value $Th_{high}$.

The trace 714 represents operation of the state machine 602 in accordance with the state transition diagram 400 shown in FIG. 4. For example, the load profile 702 shows a low-to-high transition at time t0, which initiates the timer T2. The trace 714 shows that the state machine 606, operating in accordance with state transition diagram 400, restarts the timer T2 at time $t_1$ because of the high-to-low transition that occurs while timer T2 is running. When the timer T2 expires at $t_3$, the mode signal 606 is de-asserted (LPM mode) because of the low-load condition that exists at time $t_3$.

Noteworthy are the high-to-low transitions in the load profile 702 beginning at time $t_5$. The trace 714 shows the timer T2 being restarted twice, at times $t_5$ and $t_7$, because the high-to-low transitions occur while timer T2 is running Another noteworthy transition is the high-to-low transition that occurs with the pulse at time $t_c$. This transition does not trigger a restart of timer T2 because the load profile shows that the load current $I_{load}$ did not fall below the low-load threshold value $Th_{low}$.

The trace 716 represents operation of the state machine 602 in accordance with the state transition diagram 500 shown in FIG. 5. For example, the load profile 702 shows a low-to-high transition at time $t_4$, which initiates the timer T2. The state machine 602 ignores the high-to-low transition at time $t_5$, in accordance with the state transition diagram 500. At time $t_6$, however, the low-to-high transition causes the state machine 602 to wait for the timer T2 to run out, and when the timer T2 expires, it is restarted.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims Based on the above disclosure and the following claims, other arrangements, embodiments, implementations and equivalents may be employed without departing from the scope of the present disclosure as defined by the claims.

What is claimed is:

1. A method in a voltage regulator circuit, the method comprising:
   selectively operating the voltage regulator circuit in a first mode of operation and a second mode of operation;
   changing operation of the voltage regulator circuit from the first mode of operation to the second mode of operation in response to a change in a sensed load condition of the voltage regulator circuit from a first load condition to a second load condition, wherein changing the operation includes starting a timer to run for a predetermined period of time T;
   restarting the timer in response to a change in the sensed load condition in a given direction before expiration of the timer; and
   changing operation of the voltage regulator circuit from the second mode of operation to the first mode of operation in response to the sensed load condition changing from the second load condition to the first load condition, but only when the sensed load condition has not changed in the given direction between the first load condition and the second load condition for at least the predetermined period of time T.

2. The method of claim 1, wherein a change in the sensed load condition in the given direction is a change from the first load condition to the second load condition.

3. The method of claim 1, wherein a change in the sensed load condition in the given direction is a change from the second load condition to the first load condition.

4. The method of claim 1, further comprising accessing a programmable data storage configured to store a value representative of the predetermined period of time T.

5. The method of claim 1, wherein
   the operation of the voltage regulator circuit is changed from the second mode of operation to the first mode of operation only at a time subsequent to expiration of the timer.

6. The method of claim 1,
   wherein the timer is restarted in response to detecting a change in the sensed load condition from the first load condition to the second load condition prior to expiration of the timer.

7. The method of claim 1,
   wherein the timer is restarted in response to detecting a change in the sensed load condition from the second load condition to the first load condition prior to expiration of the timer.

8. The method of claim 1,
   wherein the timer is restarted at expiration of the timer in response to detecting a change in the sensed load condition from the first load condition to the second load condition prior to expiration of the timer.

9. The method of claim 1, further comprising indicating that the first load condition exists in response to a sensed output current at the output of the voltage regulator circuit being less than a first threshold value and indicating that the second load condition exists in response to the sensed output current being greater than a second threshold value.

10. The method of claim 9, wherein the first threshold value is less than the second threshold value.

11. The method of claim 1, further comprising operating the voltage regulator circuit as a buck regulator.

12. The method of claim 11, wherein the first mode of operation is a pulse-skipping mode.

13. A voltage regulator circuit comprising:
   an output configured to connect to a load;
   an output stage connected to the output;
   a controller configured to control the output stage; and
   a feedback connection between the output and the controller, the controller configured to control the output stage based on feedback from the output,
   the controller further configured to control the output stage based on a sensed load condition, including the controller being configured to:
      switch operation of the voltage regulator circuit from a first mode of operation to a second mode of operation in response to an indication that the sensed load condition changed from a first load condition to a second load condition;
      start a timer to run for the predetermined period of time T subsequent to switching operation of the voltage regulator circuit from the first mode of operation to the second mode of operation;
      restart the timer in response to a change in the sensed load condition in a given direction before expiration of the timer; and
      switch operation of the voltage regulator circuit from the second mode of operation to the first mode of operation in response to an indication that the sensed load condition changed from the second load condition to the first load condition, but only when the sensed load condition has not changed in the given direction between the first load condition and the second load condition for at least the predetermined period of time T.

14. The circuit of claim 13, further comprising a programmable data store configured to store a value representative of the predetermined period of time T.

15. The circuit of claim 13, wherein the operation of the voltage regulator circuit is switched from the second mode of operation to the first mode of operation only at a time subsequent to expiration of the timer.

16. The circuit of claim 13, wherein the timer is restarted in response to the sensed load condition having changed from the first load condition to the second load condition prior to expiration of the timer.

17. The circuit of claim 13, wherein the timer is restarted in response to the sensed load condition having changed from the second load condition to the first load condition prior to expiration of the timer.

18. The circuit of claim 13, wherein the timer is restarted at expiration of the timer in response to the sensed load condition having changed from the first load condition to the second load condition prior to expiration of the timer.

19. The circuit of claim 13, further comprising a current sensor configured to sense an output current at the output of the voltage regulator circuit, wherein the first load condition exists when a sensed output current is less than a first threshold value, wherein the second load condition exists when the sensed output current is greater than a second threshold value.

20. The circuit of claim 19, wherein the first threshold value is less than the second threshold value.

21. The circuit of claim 13, wherein the voltage regulator circuit is a buck regulator.

22. A voltage regulator comprising:
first means for selectively operating the voltage regulator circuit in a first mode of operation and a second mode of operation; and
second means, in communication with the first means, for changing operation of the voltage regulator circuit from the first mode of operation to the second mode of operation in response to a change in a sensed load condition at an output of the voltage regulator circuit from a first load condition to a second load condition,
third means, in communication with the second means, for operating a timer to run for a predetermined period of time T subsequent to the voltage regulator circuit being changed from the first mode of operation to the second mode of operation, the timer being restarted in response to the sensed load condition changing in a given direction prior to expiration of the timer;
the second means further for changing operation of the voltage regulator circuit from the second mode of operation to the first mode of operation in response to the sensed load condition changing from the second load condition to the first load condition, but only when the sensed load condition has not changed in the given direction between the first load condition and the second load condition for at least the predetermined period of time T.

23. The circuit of claim 22, wherein the voltage regulator circuit is a buck regulator.

* * * * *